Oct. 29, 1929. W. J. CAMPBELL Re. 17,475
SLICING MACHINE
Original Filed March 10, 1928
Fig. 1
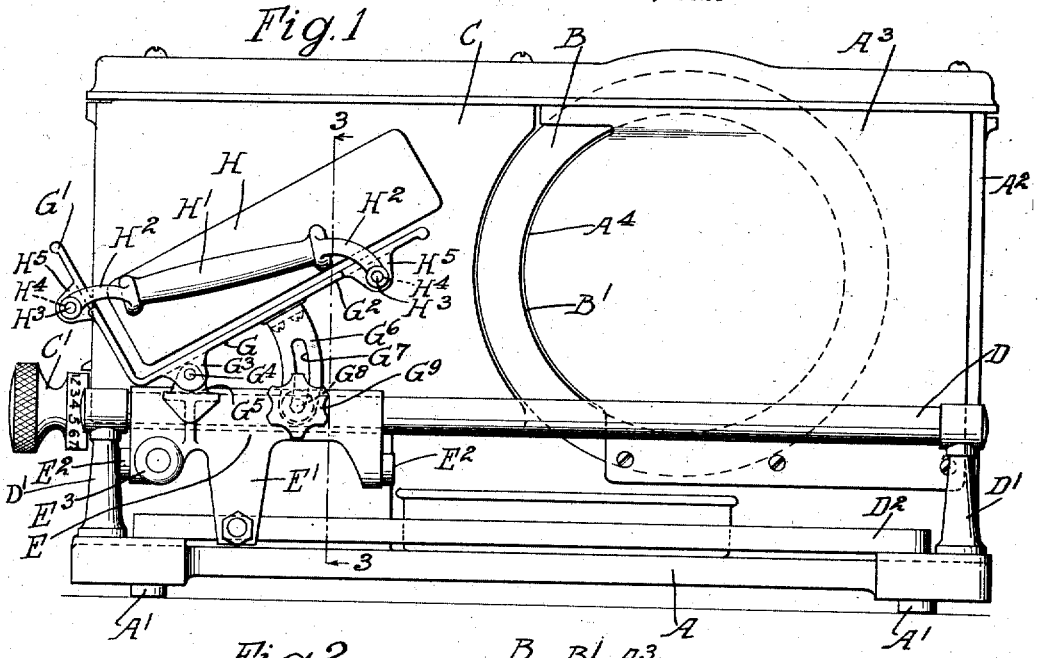
Fig. 2
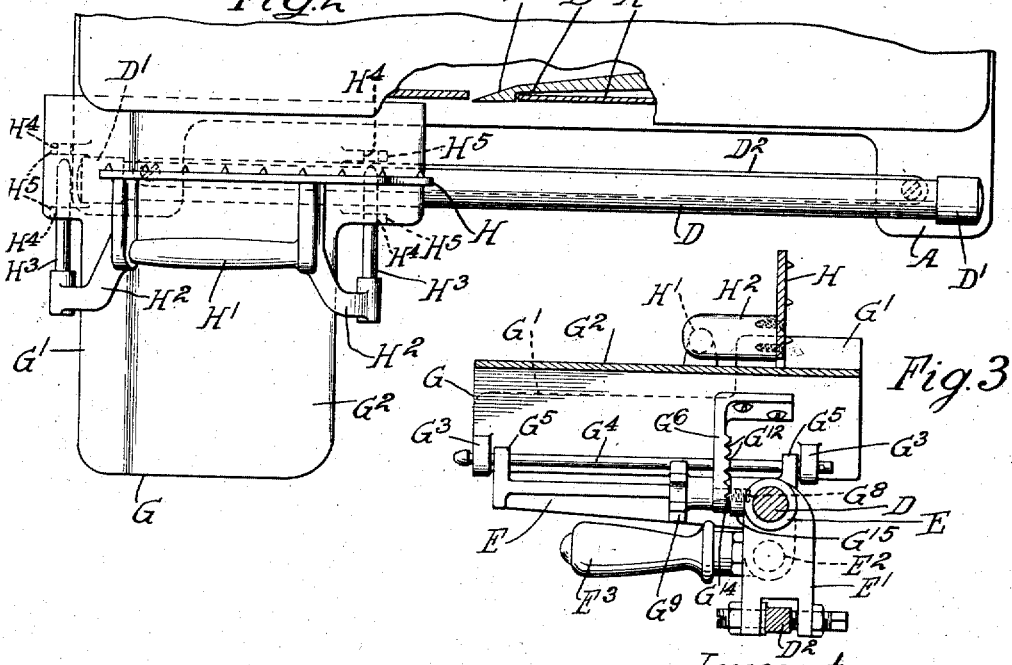
Fig. 3
Inventor
William J. Campbell
by Parker & Carter
Attorneys.

Reissued Oct. 29, 1929

Re. 17,475

UNITED STATES PATENT OFFICE

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK

SLICING MACHINE

Original No. 1,698,874, dated January 15, 1929, Serial No. 260,726, filed March 10, 1928. Application for reissue filed May 31, 1929. Serial No. 367,476.

My invention relates to a slicing machine of the type having a rotary knife. One object of my invention is to provide an improvement in carriages for use with such a slicing machine, whereby the material to be sliced is passed across the face of the knife and into contact with the cutting edge thereof. Another object is the provision of such a carriage in which the work engaging member proper shall be mounted upon said carriage for adjustment to various positions. Another object is the provision of such a carriage which is useful for slicing small pieces of material and which may be adjusted into position for slicing larger pieces of material. Another object is the provision of such a carriage which shall at one adjustment provide a V-shaped trough to support the material to be sliced and at another adjustment shall present an extended generally plane and horizontal supporting surface. Other objects will appear from time to time in the course of the specification and claims.

I illustrate my invention more or less diagrammatically in the accompanying drawings, wherein—

Figure 1 is a side elevation of my device;

Figure 2 is a plan view with parts broken away; and

Figure 3 is a section on the line 3—3 of Figure 1.

Like parts are indicated by like symbols throughout the specification and drawings.

Referring to the drawings A indicates any suitable base member for my slicing machine, with the ground engaging studs $A^1$. $A^2$ is any suitable housing member upwardly projecting therefrom with the face plate $A^3$ associated with forward portion thereof and arcuately cut away as at $A^4$ to expose the portion of the periphery of the knife B. It will be understood that any means may be employed for rotating the knife and, as such means do not form part of the present invention they are not herein indicated. In order to bring the edge of the knife into the plane of the face plate and of the later described gauge plate I prefer to tilt its axis slightly from perpendicularity to the face plate $A^3$, the edge of the face plate penetrating a depression $B^1$ formed in the face of the knife.

C indicates any suitable gauge plate which may be adjusted for example by rotation of the knob $C^1$ through mechanism which forms no part of the present invention and is therefore not illustrated.

D indicates a guide track or rod mounted at its ends on the supports $D^1$ and herein shown as overlying the secondary guide track $D^2$.

E generally indicates a carriage slidable along the rod D and, in the form herein shown, rotatable thereabout. It is provided with a downward extension $E^1$ which engages the track $D^2$ and thus prevents rotation of the carriage about the track D. $E^2$ are yielding buffers at the opposite ends of the carriage and $E^3$ a handle for its manual actuation.

G generally indicates a supporting member or trough having one narow side $G^1$ and a wide side $G^2$ herein shown as substantially at right angles thereto. The member G is provided with a lug or lugs $G^3$ through which passes any suitable pivot rod or member $G^4$ which in turn passes through corresponding lugs $G^5$ on the carriage. $G^6$ is an adjusting segment slotted as at $G^7$ the slot being penetrated by any suitable locking member $G^8$ herein shown as controlled by the manual knob $G^9$. The size of the member $G^6$ and the length of the slot $G^7$ are such that when the member G is rotated into the position in which it is shown in Figure 1 it presents a V-shaped trough adaptable for the slicing of relatively small articles. When the knob $G^9$ is rotated to release the adjusting segment $G^6$, the member G can be rotated into lower position, with its side $G^2$ then lying in a generally horizontal plane. When in such position larger articles may be deposited thereupon. For example it may then be employed to trim the rind from pieces of bacon or to cut the crust from bread, sandwich loaves and the like. In order to prevent any possible slipping of the supporting member G in any adjusted position, the member $G^6$ may be provided with a plurality of notches $G^{12}$, one or more of which may be in engagement with one or more correspondingly shaped opposed projections $G^{14}$, integral with the boss or bearing member $G^{15}$ on the carriage E.

I also provide a pusher plate indicated as H which is provided with the handle $H^1$. Laterally extending from said handle are the arms $H^2$ to which are secured the guide pins $H^3$ which penetrate apertures $H^4$ in the lugs $H^5$ extending downwardly from the members $G^1$ and $G^2$ respectively. It will be observed that this pusher plate is fully operative at all positions of the member G.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing. In particular I wish it to be understood that in illustrating the support pivoted to the carriage I employ such a pivoted support as an example of my preferred solution of the problem and not as limiting me specifically to the use of a pivoted support.

I claim:

1. In a slicing machine having a rotary knife and means for driving it, a carriage and means for guiding it for rectilinear movement across the face of said knife, and a work support pivoted upon said carriage for rotation about an axis at right angles to the path of movement of the carriage and means for holding it normally fixed against such rotation.

2. In a slicing machine having a rotary knife and means for driving it, a carriage and means for guiding it across the face of said knife, and a work support pivoted upon said carriage, for rotation about an axis at right angles to the path of movement of the carriage, and means for adjusting it and for locking it at adjusted position.

3. In a slicing machine having a rotary knife and means for driving it, a carriage and means for guiding it across the face of said knife, and a work support pivoted upon said carriage, and means for adjusting it and for locking it at adjusted position, including a slotted adjusting segment interposed between said work support and the carriage and locking means associated therewith.

4. In a slicing machine having a rotary knife and means for driving it, a carriage and means for guiding it for rectilinear movement across the face of said knife, and a work support pivoted upon said carriage, for rotation about a horizontal axis at right angles to the path of movement of the carriage and means for holding it normally fixed against such rotation.

5. In a slicing machine having a rotary knife and means for driving it, a carriage and means for guiding it for rectilinear movement across the face of said knife, and a work support pivoted upon said carriage, for rotation about a horizontal axis, generally perpendicular to the face of the knife and means for holding it normally fixed against such rotation.

6. In a slicing machine having a rotary knife and means for driving it, a carriage and means for guiding it across the face of said knife, and a work support pivoted upon said carriage for rotation about an axis at right angles to the path of movement of the carriage, for rotation about a horizontal axis, generally perpendicular to the face of the knife, and means for adjusting it and for locking it at adjusted position.

7. In a slicing machine having a rotary knife and means for driving it, a carriage and means for guiding it for rectilinear movement across the face of said knife, and a work support pivoted upon said carriage, for rotation about an axis at right angles to the path of movement of the carriage and means for holding it normally fixed against such rotation, said support including two supporting members lying substantially at right angles to each other.

8. In a slicing machine having a rotary knife and means for driving it, a carriage and means for guiding it for rectilinear movement across the face of said knife, and a work support pivoted upon said carriage and means for holding it normally fixed against such rotation, said support including two supporting members having a fixed angular relation to each other.

9. In a slicing machine having a rotary knife and means for driving it, a carriage and means for guiding it for rectilinear movement across the face of said knife, and a work support pivoted upon said carriage, said support including two supporting members having a fixed angular relation to each other, and of unequal lateral extension and means for holding it normally fixed against such rotation.

10. In a slicing machine having a rotary knife and means for driving it, a carriage and means for guiding it across the face of said knife, and a work support pivoted upon said carriage, said support including two supporting members having a fixed angular relation to each other, and of unequal lateral extension, and locking means interposed between the supporting member of greater lateral extension than the carriage.

11. In a slicing machine having a rotary knife and means for driving it, a carriage and means for guiding it across the face of said knife, and a work support pivoted upon said carriage, said support including two supporting members having a fixed angular relation to each other and of unequal lateral extension, and locking means interposed between the supporting member of greater lateral extension than the carriage, including a slotted adjusting segment therebetween and locking means associated therewith.

12. In a slicing machine having a rotary knife and means for driving it, a carriage and means for guiding it across the face of said knife, and a work support pivoted upon said carriage, said support including two supporting members lying substantially at right angles to each other, and a slotted adjusting segment interposed between said work support and the carriage and locking means associated therewith.

13. In a slicing machine having a rotary knife and means for driving it, a carriage and means for guiding it across the face of said knife, and a work support pivoted upon said carriage, and a pusher plate mounted upon said work support.

14. In a slicing machine having a rotary knife and means for driving it, a carriage and means for guiding it across the face of said knife, and a work support pivoted upon said carriage, and a pusher plate mounted upon said work support, and operative at all positions of adjustment of said support.

15. In a slicing machine having a rotary knife and means for driving it, a carriage and means for guiding it across the face of said knife, a work support mounted upon said carriage, means for adjusting said work support selectively in a horizontal plane and in a plane inclined from the horizontal.

16. In a slicing machine having a rotary knife and means for driving it, a carriage and means for guiding it across the face of said knife, a work support mounted on said carriage, and means for selectively positioning it in a plane parallel with the path of movement of the carriage and in a plane inclined to the path of movement of the carriage, while holding it generally perpendicular to the cutting plane of the knife.

17. In a slicing machine having a rotary knife and means for driving it, a carriage and means for guiding it across the face of said knife, a work support mounted on said carriage, and means for selectively positioning it in a plane parallel with the path of movement of the carriage and in a plane inclined to the path of movement of the carriage.

18. In a slicing machine having a rotary knife and means for driving it, a work support and means for guiding it across the face of said knife, said work support including a relatively extended work engaging member, and means for positioning said work engaging member selectively in a horizontal plane and in a plane inclined from the horizontal.

19. In a slicing machine having a rotary knife and means for driving it, a carriage and means for guiding it across the face of the knife, and a work support movably mounted upon said carriage for movement into and out of the horizontal, and a slotted adjusting member interposed between said work support and said carriage.

20. In a slicing machine having a rotary knife and means for driving it, a carriage and means for guiding it across the face of said knife, a work support adjustably mounted upon said carriage for movement into and out of the horizontal and means for adjusting said work support at a plurality of positions, including the horizontal, and a pusher plate mounted upon said work support.

21. In a slicing machine having a rotary knife and means for driving it, a carriage and means for guiding it across the face of said knife, and a work support adjustable upon said carriage, said support including two supporting members having a fixed angular relation to each other, one being adapted to be positioned in a generally horizontal plane at one limit of adjustment of the support in relation to the carriage.

22. In a slicing machine having a rotary knife and means for driving it, a carriage and means for guiding it across the face of said knife, and a work support adjustable upon said carriage, said support including two supporting members having a fixed angular relation to each other, and means for supporting said support, at one position, with one of its supporting members lying in a generally horizontal plane.

23. In a slicing machine having a rotary knife and means for driving it, a carriage and means for guiding it in a generally rectilinear path across the face of the knife, and a work support, pivotally adjustable in relation to the carriage, for rotation about a generally horizontal axis generally perpendicular to the path of movement of the carriage, and means for normally holding it against said rotation.

24. In a slicing machine having a rotary knife and means for driving it, a carriage and means for guiding it in a generally rectilinear path across the face of the knife, and a work support, supported upon and pivoted to the carriage, for rotation about a generally horizontal axis generally perpendicular to the path of movement of the carriage, and means for locking it at adjusted positions.

25. In a slicing machine having a rotary knife and means for driving it, a carriage and means for guiding it across the face of the knife, and a work support tiltably mounted upon said carriage for movement into and out of the horizontal plane, and means for adjusting said work support selectively at a plurality of positions, including the horizontal.

Signed at Indianapolis, county of Marion and State of Indiana, this 23 day of May, 1929.

WILLIAM J. CAMPBELL.